United States Patent
Willcox

(10) Patent No.: US 12,467,800 B2
(45) Date of Patent: Nov. 11, 2025

(54) HEAT FLOW-BASED PROCESS FLUID TEMPERATURE ESTIMATION SYSTEM WITH THERMAL TIME RESPONSE IMPROVEMENT

(71) Applicant: Rosemount Inc., Shakopee, MN (US)

(72) Inventor: Charles R. Willcox, Hopkins, MN (US)

(73) Assignee: Rosemount Inc., Shakopee, MN (US)

( * ) Notice: Subject to any disclaimer, the term of this patent is extended or adjusted under 35 U.S.C. 154(b) by 369 days.

(21) Appl. No.: 17/848,625

(22) Filed: Jun. 24, 2022

(65) Prior Publication Data

US 2022/0412815 A1 Dec. 29, 2022

Related U.S. Application Data

(60) Provisional application No. 63/215,033, filed on Jun. 25, 2021.

(51) Int. Cl.
G01K 1/143 (2021.01)
G01K 7/42 (2006.01)
G01K 13/02 (2021.01)

(52) U.S. Cl.
CPC .............. *G01K 13/02* (2013.01); *G01K 1/143* (2013.01); *G01K 7/427* (2013.01)

(58) Field of Classification Search
CPC ......... G01K 1/143; G01K 7/427; G01K 13/02
See application file for complete search history.

(56) References Cited

U.S. PATENT DOCUMENTS 7,165,883 B2 1/2007 Nimbergger et al.
7,748,267 B2 7/2010 Olin et al.
(Continued)

FOREIGN PATENT DOCUMENTS

CN 101571428 A 11/2009
JP 2004-333479 A 11/2004
(Continued)

OTHER PUBLICATIONS

Computer translation of JP 2020-508474 downloaded from the JPO website on Apr. 11, 2025.*
Computer translation of JP 2020-508474 downloaded from the JPO website of Jul. 18, 2025.*
International Search Report and Written Opinion for International Patent Application No. PCT/US2022/034839, dated Oct. 21, 2022, 12 pages.
International Search Report and Written Opinion for International Patent Application No. PCT/US2019/051911, dated Jan. 3, 2020, 14 pages.
(Continued)

*Primary Examiner* — Randy W Gibson
(74) *Attorney, Agent, or Firm* — Christopher R. Christenson; Kelly, Holt & Christenson, P.L.L.C.

(57) ABSTRACT

A process fluid temperature estimation system includes a mounting assembly configured to mount the process fluid temperature estimation system to an external surface of a process fluid conduit. A sensor capsule has at least one temperature sensitive element disposed therein and is configured to sense at least a temperature of the external surface of the process fluid conduit. Measurement circuitry is coupled to the sensor capsule and is configured to detect a characteristic of the at least one temperature sensitive element that varies with temperature and provide sensor capsule temperature information. A controller is coupled to the measurement circuitry and is configured to obtain a temperature measurement of the external surface of the process fluid conduit and to obtain a reference temperature and employ a heat transfer calculation with the reference temperature, the external surface temperature measurement and a known thermal relationship between the external surface temperature sensor in the sensor capsule and the reference temperature to generate an estimated process fluid temperature output. The controller is also configured to improve response time of the process fluid estimation system mathematically. In some examples, the controller is configured to extract the system tau value from the measured data.

13 Claims, 11 Drawing Sheets

(56) References Cited

U.S. PATENT DOCUMENTS

| | | |
|---|---|---|
| 8,063,644 B2 | 11/2011 | Rezvani et al. |
| 9,360,377 B2 | 6/2016 | Converse |
| 10,317,295 B2 | 6/2019 | Rud et al. |
| 11,029,215 B2 | 6/2021 | Cavanaugh |
| 11,073,429 B2 | 7/2021 | Rud |
| 11,320,316 B2 | 5/2022 | Rud et al. |
| 2004/0101030 A1 | 5/2004 | Trapasso et al. |
| 2005/0223828 A1 | 10/2005 | Olin |
| 2016/0178446 A1 | 6/2016 | Ude |
| 2016/0187272 A1 | 6/2016 | Ishii et al. |
| 2017/0059498 A1 | 3/2017 | Yeh |
| 2017/0212065 A1 | 7/2017 | Rud et al. |
| 2018/0003655 A1 | 1/2018 | Rud et al. |
| 2019/0277711 A1 | 9/2019 | Rud |
| 2019/0293241 A1 | 9/2019 | Rud et al. |
| 2020/0103293 A1 | 4/2020 | Rod et al. |
| 2022/0390292 A1* | 12/2022 | Roghanizad ........... G01K 7/427 |

FOREIGN PATENT DOCUMENTS

| | | |
|---|---|---|
| JP | 2005-055378 A | 3/2005 |
| JP | 2016-121985 A | 7/2016 |
| JP | 2020-508474 A | 3/2020 |
| WO | 2020068551 A1 | 4/2020 |

OTHER PUBLICATIONS

JP 2023-579189—Office Action dated Jan. 21, 2025, 17 pages.
CA 3,222,877—Office Action dated Jan. 30, 2025, 4 pages.
Supplementary European Search Report received for European Patent Application No. 22829356.9, Dated Mar. 21, 2025, 8 pages.

* cited by examiner

Lumped Parameter Thermal Model

HEAT FLOW-BASED PROCESS FLUID TEMPERATURE ESTIMATION SYSTEM WITH THERMAL TIME RESPONSE IMPROVEMENT

CROSS-REFERENCE TO RELATED APPLICATIONS

The present application is based on and claims the benefit of U.S. Provisional Patent Application Ser. No. 63/215,033 filed Jun. 25, 2021, the content of which is hereby incorporated by reference in its entirety.

BACKGROUND

The process industry employs process variable transmitters to monitor process variables associated with substances such as solids, slurries, liquids, vapors, and gases in chemical, pulp, petroleum, pharmaceutical, food and other fluid process plants. Process variables includes pressure, temperature, flow, level, turbidity, density, concentration, chemical composition, and other properties.

A process fluid temperature transmitter provides an output related to a process fluid temperature. The temperature transmitter output can be communicated over a process control loop to a control room, or the output can be communicated to another process device such that the process can be monitored and controlled.

Traditionally, process fluid temperature transmitters were coupled to or employed thermowells which provided a temperature sensor in thermal communication with a process fluid but otherwise protected the temperature sensor from direct contact with the process fluid. The thermowell is positioned within the process fluid in order to ensure substantial thermal contact between the process fluid and the temperature sensor disposed inside the thermowell. Thermowells are typically designed using relatively robust metal structures such that the thermowell can withstand a number of challenges provided by the process fluid. Such challenges can include physical challenges, such as process fluid flowing past the thermowell at a relatively high rate; thermal challenges, such as extremely high temperature; pressure challenges, such as the process fluid being conveyed or stored at a high pressure; and chemical challenges, such as those provided by a caustic process fluid. Further, thermowells can be difficult to design into a process installation. Such thermowells require a process intrusion where the thermowell is mounted to and extends into a process vessel such as a tank or pipe. This process intrusion itself must be carefully designed and controlled such that the process fluid does not leak from the vessel at the intrusion point.

There are a number of factors that can compromise the structural integrity of a thermowell. In some cases, not all factors may be fully considered and thermowells have sometimes bent or even broken thereby requiring the process installation to be shut down for a significant period of time. For some applications, a thermowell simply cannot be used without potential damage. In such applications, it may be beneficial, or even required, to use a non-invasive process fluid temperature calculation system. With such a system, a pipe clamp sensor is used to couple a temperature sensor to a process vessel, such as a pipe. While such a non-invasive process fluid temperature calculation provides the benefit of not requiring a process intrusion, nor subjecting a thermowell directly to the process fluid, there is a tradeoff. Specifically, a non-invasive temperature calculation system is typically less accurate in detecting the process fluid temperature than a thermowell which extends into the process fluid and measures the temperature directly.

The desire to use non-intrusive temperature sensors located on the exterior of the pipe such as described above is significant, however, users are generally more familiar with the response times of thermowell sensors. This creates similar expectations when using heat flow-based temperature estimation systems. Improving the response time of the heat flow-based temperature estimation system sensor will help remove this barrier and facilitate user adoption, as well as increase the application areas currently enjoyed by thermowells.

SUMMARY

A process fluid temperature estimation system includes a mounting assembly configured to mount the process fluid temperature estimation system to an external surface of a process fluid conduit. A sensor capsule has at least one temperature sensitive element disposed therein and is configured to sense at least a temperature of the external surface of the process fluid conduit. Measurement circuitry is coupled to the sensor capsule and is configured to detect a characteristic of at least one temperature sensitive element that varies with temperature and provide sensor capsule temperature information. A controller is coupled to the measurement circuitry and is configured to obtain a temperature measurement of the external surface of the process fluid conduit and to obtain a reference temperature and employ a heat transfer calculation with the reference temperature, the external surface temperature measurement and a known thermal relationship between the external surface temperature sensor in the sensor capsule and the reference temperature to generate an estimated process fluid temperature output. The controller is also configured to improve response time of the process fluid estimation system mathematically.

DETAILED DESCRIPTION OF ILLUSTRATIVE EMBODIMENTS

Figure 1A:
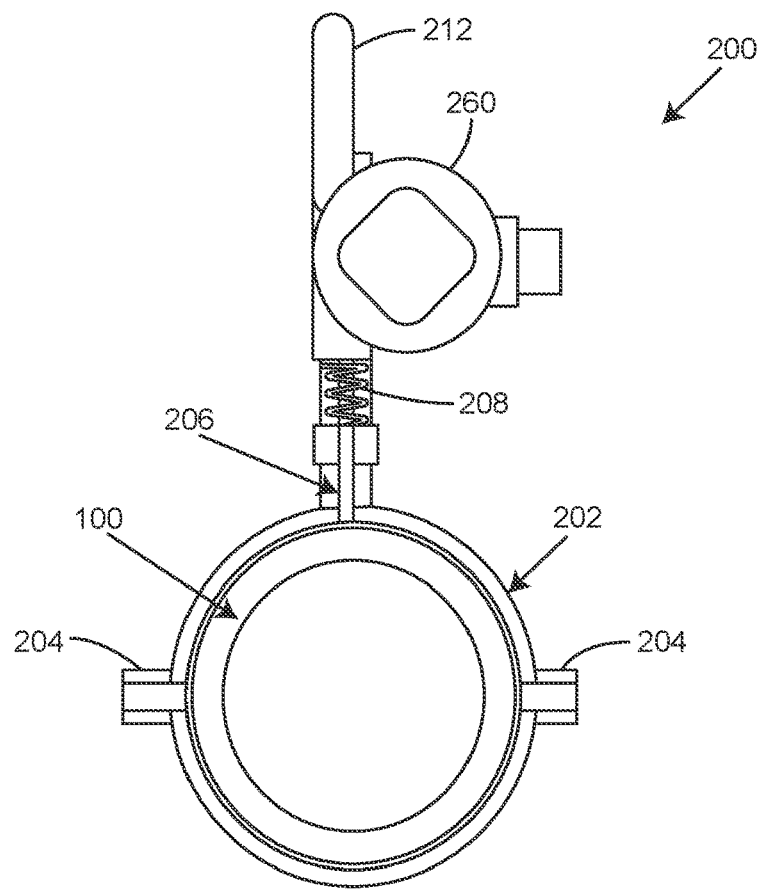
FIG. 1A is diagrammatic view of a process fluid temperature estimation system with which embodiments described herein are particularly applicable.

FIG. 1A is diagrammatic view of a process fluid temperature estimation system with which embodiments described herein are particularly applicable. As illustrated, system 200 generally includes a pipe clamp portion 202 that is configured to clamp around a conduit or pipe 100. Pipe clamp 202 may have one or more clamp ears 204 in order to allow the clamp portion 202 to be positioned and clamped to pipe 100. While the clamp illustrated with respect to FIG. 1A is particularly useful, any suitable mechanical arrangement for securely positioning system 200 about an exterior surface of a pipe can be used in accordance with embodiments described herein.

System 200 includes heat flow sensor capsule 206 that is forced against the external diameter of a pipe by a spring 208. The term "capsule" is not intended to imply any particular structure or shape and can thus be formed in a variety of shapes, sizes and configurations. Sensor capsule 206 generally includes one or more temperature sensitive elements, such as resistance temperature devices (RTDs) or thermocouples. Sensors within capsule 206 are electrically connected to transmitter circuitry within housing 260, which circuitry is configured to obtain one or more temperature measurements from sensor capsule 206 and calculate an estimate of the process fluid temperature based on the measurements from sensor capsule 206, and a reference temperature, such as a temperature measured within housing 260, or otherwise provided to circuitry within housing 260.

In one example, the basic heat flow calculation can be simplified into:

$$T_{corrected} = T_{skin}(T_{skin} - T_{reference}) * (R_{pipe}/R_{sensor})$$

In this equation, $T_{skin}$ is the measured temperature of the external surface of pipe 100. $T_{reference}$ is a second temperature obtained relative to a location having a known thermal impedance ($R_{sensor}$) from the temperature sensitive element that measures $T_{skin}$. $T_{reference}$ may be sensed by a dedicated sensor within housing 260. However, $T_{reference}$ can be sensed or inferred in other ways as well. For example, a temperature sensor can be positioned external to the transmitter to replace the terminal temperature measurement in the heat transfer calculation. This external sensor would measure the temperature of the environment surrounding the transmitter. As another example, industrial electronics typically have on-board temperature measurement capabilities. This electronics temperature measurement can be used as a substitute to the terminal temperature for the heat transfer calculation. As another example, if the thermal conductivity of the system is known and the ambient temperature around the transmitter is fixed or user-controlled, the fixed or user-controlled temperature can be used as the reference temperature.

$R_{pipe}$ is the thermal impedance of the conduit and can be obtained manually by obtaining pipe material information, pipe wall thickness, et cetera. Alternatively, a parameter related to $R_{pipe}$ can be determined during calibration and stored for subsequent use. Accordingly, using a suitable heat flux calculation, such as that described above, circuitry within housing 260 is able to calculate an estimate for the process fluid temperature ($T_{corrected}$) and convey an indication regarding such process fluid temperature to suitable devices and/or a control room. In the example illustrated in FIG. 1, such information can be conveyed wirelessly via antenna 212.

Figure 1B:
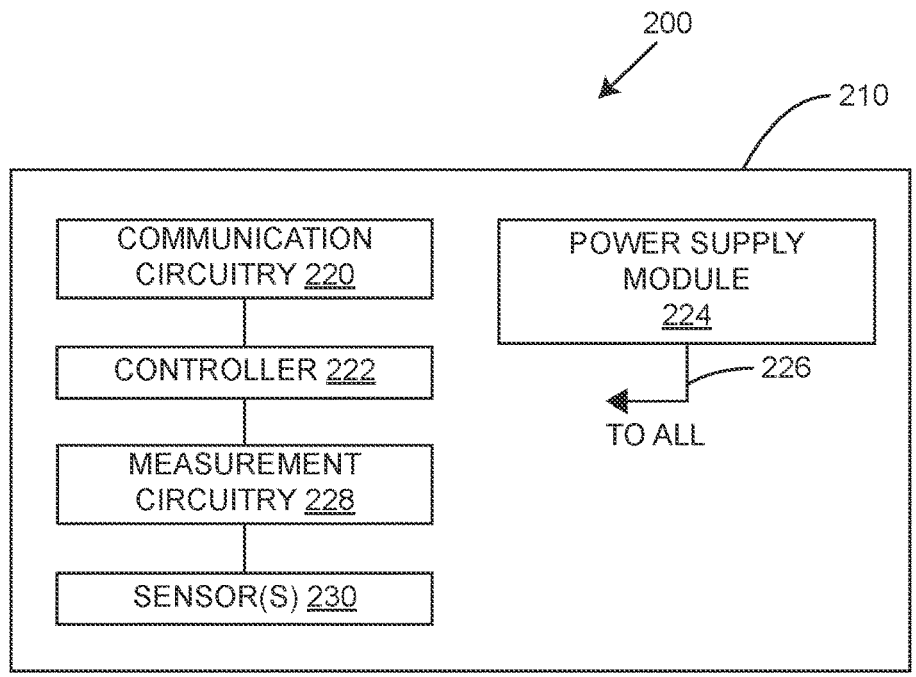
FIG. 1B is a block diagram of a process fluid temperature estimation system with which embodiments described herein are particularly applicable.

FIG. 1B is a block diagram of circuitry 210 within housing 260 of heat flow measurement system 200, with which embodiments of the present invention are particularly applicable. Circuitry 210 includes communication circuitry 220 coupled to controller 222. Communication circuitry 220 can be any suitable circuitry that is able to convey information regarding the estimated process fluid temperature. Communication circuitry 220 allows heat flow measurement system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

Heat flow measurement system 200 also includes power supply module 224 that provides power to all components of system 200 as indicated by arrow 226. In embodiments where heat flow measurement system 200 is coupled to a wired process communication loop, such as a HART® loop, or a FOUNDATION™ Fieldbus segment, power module 224 may include suitable circuitry to condition power received from the loop or segment to operate the various components of system 200. Accordingly, in such a wired process communication loop embodiments, power supply module 224 may provide suitable power conditioning to allow the entire device to be powered by the loop to which it is coupled. In other embodiments, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210. In one example, controller 222 is a microprocessor. Controller 222 is communicatively coupled to communication circuitry 220.

Measurement circuitry 228 is coupled to controller 222 and provides digital indications with respect to measurements obtained from one or more temperature sensors 230. Measurement circuitry 228 can include one or more analog-to-digital converters and/or suitable multiplexing circuitry to interface the one or more analog-to-digital converters to sensors 230. Additionally, measurement circuitry 228 can include suitable amplification and/or linearization circuitry as may be appropriate for the various types of temperature sensors employed.

For a heat flow-based temperature sensor, its heat transfer function is denoted as H(t), which describes its thermal response to a change in the process fluid temperature. In addition, Tp(t) is defined to be the process temperature that is to be computed and Tm(t) to be the measured output. The problem is then determining the value of Tp(t) (i.e., the process fluid temperature), given H(t) and a measured value of Tm(t). This procedure essentially removes the time response of the heat flow sensor since the process temperature is being extracted directly in real time.

Figure 1C:
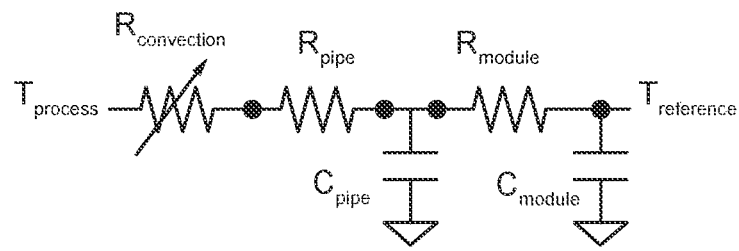
FIG. 1C is a diagrammatic view modelling heat flow relative to a process fluid conduit as an electrical circuit.

The approach can be better understood by considering a simple case that can be generalized to more complex systems. For the heat flow-based temperature estimation system shown in FIG. 1A, the fluid, pipe, and module are approximated as a lumped parameter thermal system as depicted in FIG. 1C. Such a system can be viewed as an electrical circuit comprised of thermal resistors and capacitors with nodal temperatures being the analog equivalents to voltages.

In FIG. 1C, Rconvection is the effective thermal impedance due to heat convection from the process fluid to the inside pipe wall. Rpipe and Cpipe represent the pipe's thermal resistance and heat capacity. (Note, the lumped parameter model can be broken into smaller elements to better approximate the continuum system, but the solution procedure is essentially the same, so this simplified model can be used). Lastly, the thermal resistance and heat capacity associated with the module remain fixed regardless of the process fluid conditions.

Figure 2:
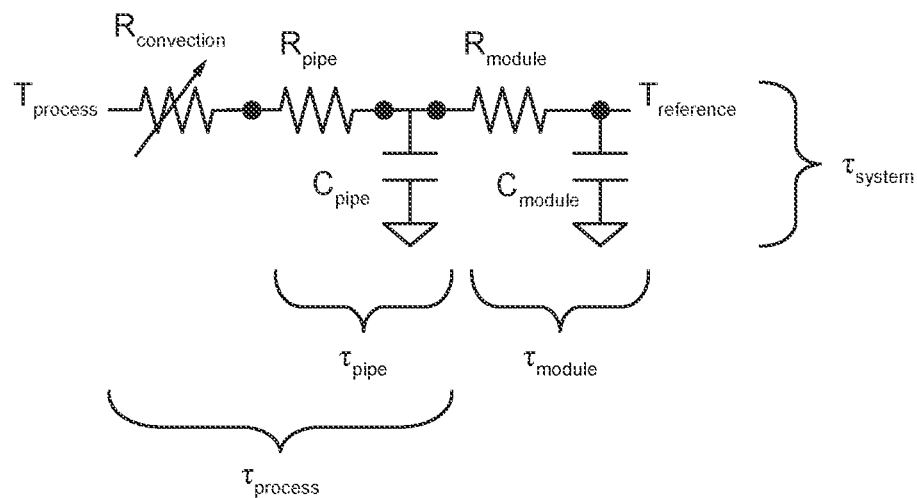
FIG. 2 is a diagrammatic view of a lumped parameter thermal model.

FIG. 2 shows the same lumped parameter thermal model, along with each section's associated time constants (tau), and nodal temperature points. Since the module section is fixed, it can be added later once the basic system is understood. Hence, for clarity, it is ignored in the following analysis.

Figure 3:
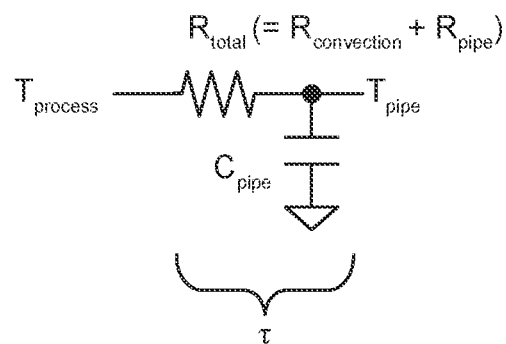
FIG. 3 is a diagrammatic view of a simplified form of the lumped parameter thermal model.

FIG. 3 is a simplified form of the lumped parameter thermal model. In FIG. 3 the simplified form of the problem is depicted. Note that Rconvection and Rpipe have been combined into Rtotal since they are in series. The R-C product has units of time and is denoted by τ(i.e., τ=Rtotal·Cpipe). Typically, to solve such a problem for arbitrary inputs Tp(t) (shorthand for Tprocess(t)) and Tm(t) (Shorthand for Tmeasured(t)–the measured response temperature), work can be done in the time domain solving convolution integrals or in the complex frequency domain using Laplace transforms. The Laplace transform representation of the simplified system can be written as:

$$T_m(s) = T_p(s) \cdot H(s) \quad \text{Equation 1}$$

where H(s) for the configuration shown in FIG. 3 is simply 1/(1+s·τ). In general, the Laplace transform of an arbitrary function is defined according to:

$$F(s) = \int_0^\infty f(t) e^{-st} dt \quad \text{Equation 2}$$

where s is a complex number frequency parameter s=σ+iω with real numbers σ and ω. The advantage of this formulation is that the solution for Tp(s) is solved by simple algebra, viz $$T_p(s) = \frac{T_m(s)}{H(s)} \quad \text{Equation 3}$$

However, to be useful, Tp(s) needs to be converted back into the time domain using an inverse Laplace transform, which symbolically is written as:

$$T_p(t) = L^{-1}\left\{\frac{T_m(s)}{H(s)}\right\} \quad \text{Equation 4}$$

where the inverse Laplace transform is defined according to:

$$f(t) = L^{-1}\{F\}(t) = \frac{1}{2\pi i} \lim_{T \to \infty} \int_{\gamma - iT}^{\gamma + iT} e^{st} F(s) ds \quad \text{Equation 5}$$

Unfortunately, the inverse Laplace computation is difficult to implement in real time on a continuous basis. Because of this difficulty, Laplace transforms are usually rendered in terms of Z-transforms, which lend themselves to discrete time-sampled data. This is the preferred approach for complex transfer functions, however, for the case of FIG. 3, it can be solved in an even simpler, more direct fashion. Recall the problem to solve is for a measured temperature Tm(t), Tp(t) needs to be computed on a continuous time basis. Rtotal and Cpipe are known, and therefore τ(=Rtotal·Cpipe) is known as well. Hence, mathematically Tp(t) can be computed. The differential equation that solves the 1st-order system of FIG. 3 is:

$$T_p(t) = T_m(t) + \tau \frac{\partial T_m}{\partial T} \quad \text{Equation 6}$$

which can be converted into a finite difference equation for discrete time steps Δt.

$$T_p(t) = T_m(t) + \tau \frac{T_m(t) - T_m(t - \Delta t)}{\Delta t} \quad \text{Equation 7}$$

Equation 7 is an example of a discretized differential equation that can be used to improve the time response of the process fluid temperature estimation system. This equation can be solved in real time on a computer or microprocessor using data taken at a sampling period of Δt.

Figure 4A:
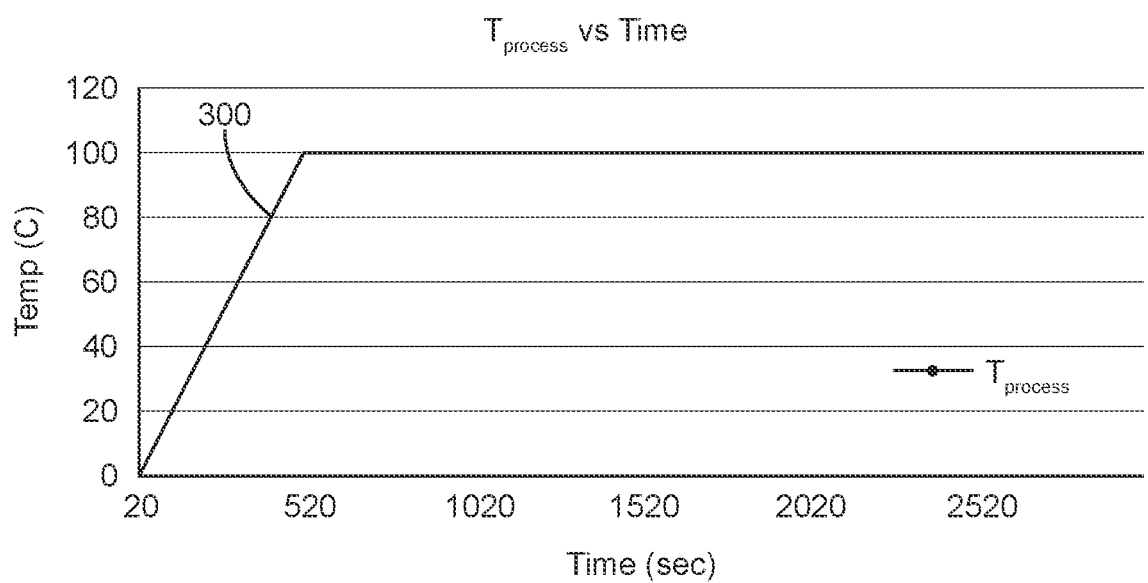
FIGS. 4A and 4B illustrate an example problem (using an arbitrary system tau value of 140 seconds) where an input temperature Tprocess is presented to the thermal system of FIG. 3.
Figure 4B:
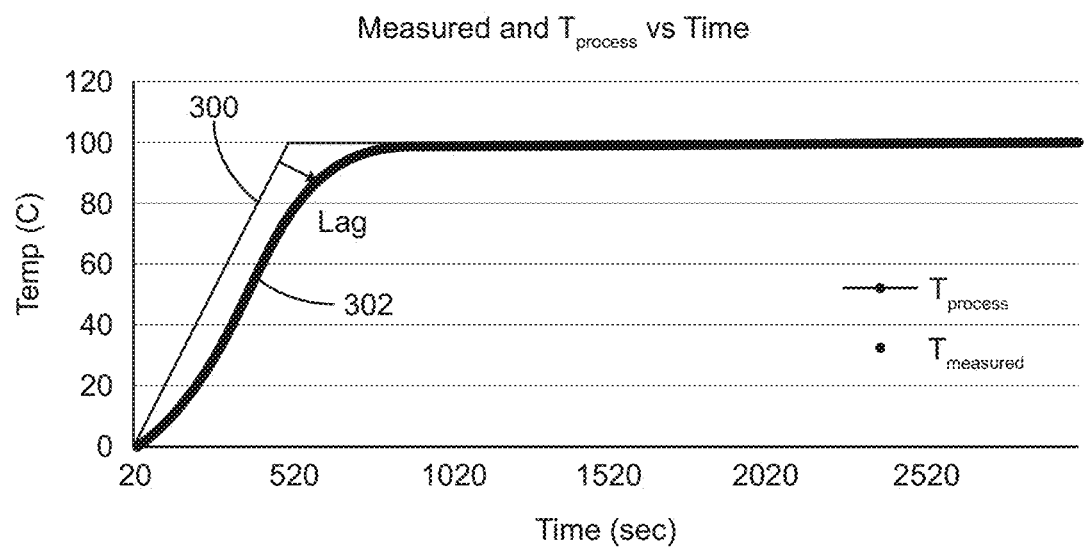

FIGS. 4A and 4B illustrate an example problem (using an arbitrary tau value of 140 seconds) where an input temperature Tprocess (reference number 300) is presented to the thermal system of FIG. 3. The resulting Tmeasured temperature is labeled at reference numeral 302 in FIG. 4B. Comparing the two curves we can see a noticeable lag on the order of tau in the measured response. This is the time response to be sped up.

Figure 4C:
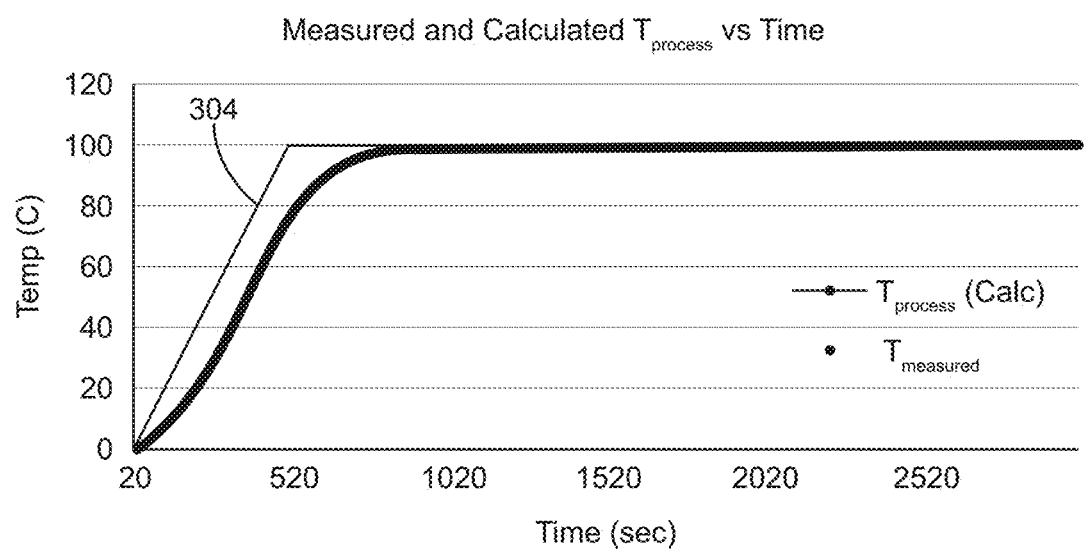
FIG. 4C illustrates the Tmeasured curve tracking with the calculated input Tprocess curve of FIG. 4A.

Using Equation 7 on the measured data yields the curve labeled 304 in FIG. 4C. Clearly, the calculated Tprocess (Calc) curve in FIG. 4C, tracks with the actual input Tprocess curve (300) of FIG. 4A. Hence, the use of Equation 7, given the correct value of tau (τ) (i.e., the value of tau for the actual system response), effectively eliminates the delayed response in Tmeasured. It should be noted that the input process temperature is not being predicted, but rather extracted from Tmeasured, which has the information buried within it along with the system response which is characterized by tau in this simple example. Note that the use of a tau value of 140 seconds is specific to the modelled system. Other values could have been used. For example, if tau is greater than 140 seconds in this example, there would be less lag, and if less than 140 seconds there would be more lag.

Figures 5A, 5B:
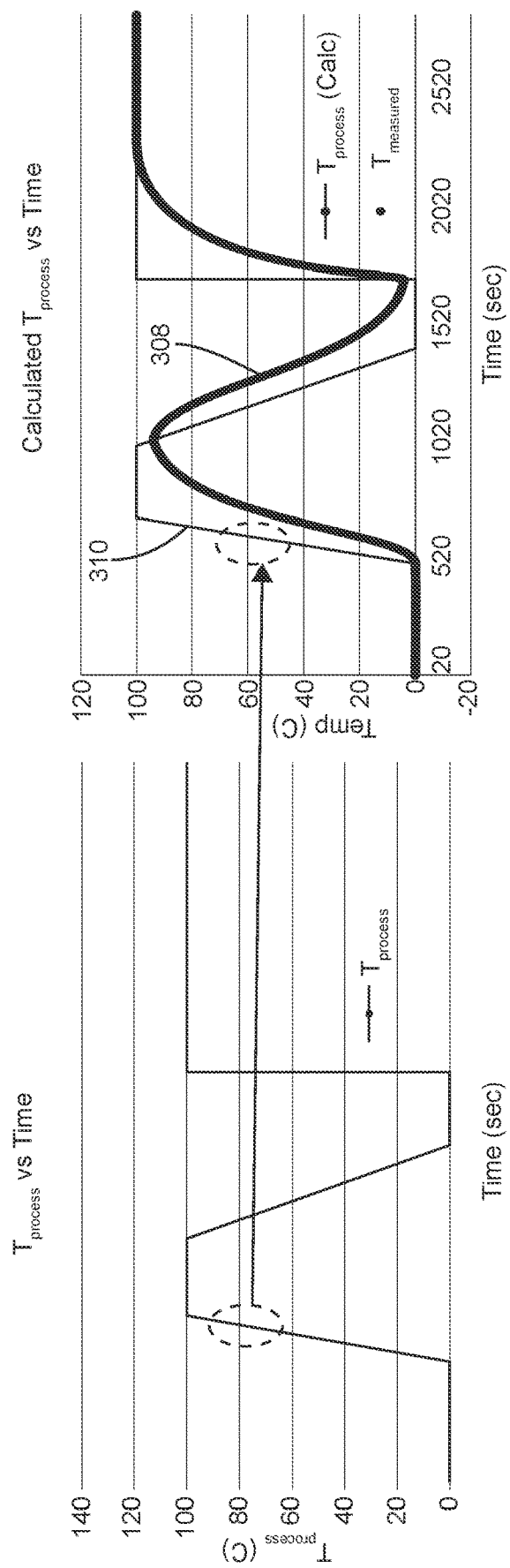
FIG. 5A illustrates another example where an input temperature Tprocess is comprised of increasing and decreasing thermal ramps.
FIG. 5B illustrates the Tmeasured curve tracking with the calculated Tprocess.

FIGS. 5A and 5B illustrate another example where an input temperature Tprocess (reference numeral 306) is comprised of up and down temperature ramps. Equation 7 was used to read Tmeasured (reference numeral 308 curve in FIG. 5B) and then extract Tprocess(Calc) (reference numeral 310 curve), again assuming a system response having a τ value of 140 seconds. As in the previous example, the calculated Tprocess(Calc) 310 line in FIG. 5B using Equation 7 reproduces to a high level, the actual Tprocess values (curve 306 in FIG. 5A).

Figure 6A:
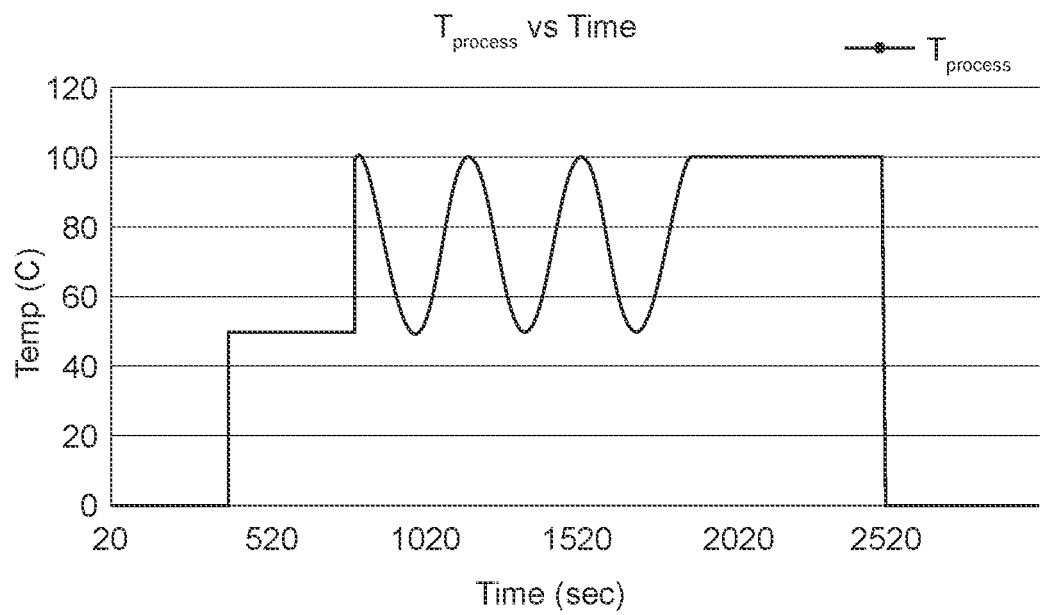
FIG. 6A is an example showing an input made of steps and sinusoidal temperature swings.
Figure 6B:
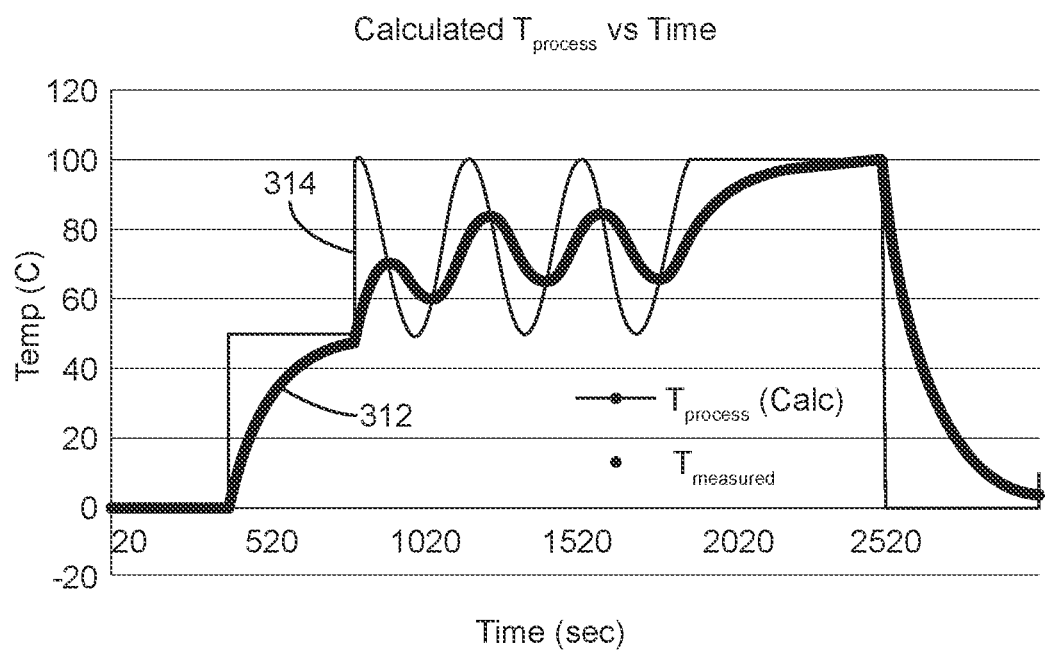
FIG. 6B is the measured response and calculated response using embodiments described herein.

One last example showing an input made of steps and sinusoidal temperature swings is displayed in FIG. 6A. FIG. 6B is the measured response (reference numeral 312) and the calculated response (reference numeral 314) using Equation 7. Again, excellent fidelity is shown in the extraction of the actual process temperature from the measured temperature data.

The above examples illustrate the validity of the described approach and present a methodology to effectively speed up the response time of heat flow-based process temperature fluid estimation systems using the measured signal provided the process response function is known, or equivalently, the system effective tau value. While the time response of the module has been ignored in the calculations above, its time constant can be easily characterized and added to the system response function either by simply adding it to the process tau as an approximation (provided it is much smaller than the process tau), or more correctly, by incorporating it into the transfer function via a Z-transform formulation.

Knowing the process tau value is important for the described procedure and depends on the particulars of the pipe (e.g., line size, wall thickness, and pipe material) as well as on the fluid properties (e.g., liquid or gas, flow velocity, temperature, et cetera.) There are suitable formulas to estimate with reasonable accuracy the values of the thermal impedances and convection values for pipe materials and line sizes, as well as flow conditions. However, it is more desirable and more accurate to extract the system response time constant directly from the raw measured temperature data. To see how this can be accomplished, consider Equation 6 and its second time derivative, labeled as Equation 8.

$$\frac{\partial T_p}{\partial t} = \frac{\partial T_m}{\partial t} + \tau \frac{\partial^2 T_m}{\partial t^2} \qquad \text{Equation 8}$$

There are two specific cases where the value τ can be determined from the measured temperature data using these equations.

In the first case, if the process changes temperature in a step-like fashion, there will be a period of time, just after the end of the step, where the process temperature is constant, but the measured temperature is still changing. Over this window, Tp(t1)=Tp(t2) (but Tm(t1)≠Tm(t2)) for the two different times, t1 and t2. When this condition is satisfied, Equation 6 can be used to evaluate τ according to, $$\tau = \left[ \frac{Tm(t_2) - Tm(t_1)}{\frac{\partial Tm(t_1)}{\partial t} - \frac{\partial Tm(t_2)}{\partial t}} \right] \qquad \text{Equation 9}$$

where Tm=Tmeasured.

In the second case, when the process temperature is ramping up or down and if the ramp rate is roughly constant (i.e., the derivatives at two different time steps are approximately the same such that dTp(t1)/dt≈dTp(t2)/dt, then from Equation 8 it can be shown that, $$\tau = \left[ \frac{\frac{\partial Tm(t_2)}{\partial t} - \frac{\partial Tm(t_1)}{\partial t}}{\frac{\partial^2 Tm(t_1)}{\partial t^2} - \frac{\partial^2 Tm(t_2)}{\partial t^2}} \right] \qquad \text{Equation 10}$$

In order to use Equations 9 or 10, some knowledge of when they can be appropriately applied is required. Unfortunately, this is not known from Tp(t) directly, since that is what needs to be extracted. However, there is information buried in the time derivatives of Tm(t) that can help determine the domains of applicability.

Figure 7:
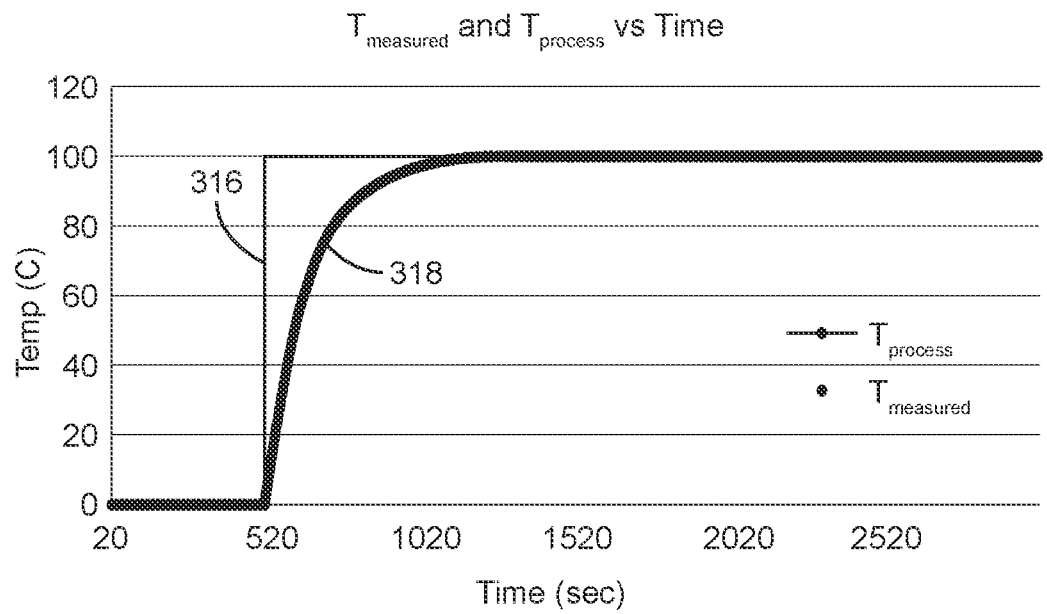
FIG. 7 is a chart illustrating a step process fluid temperature input and measured response.

For Case 1, the validity range can be determined by monitoring the first and second order time derivatives of the measured temperature. Consider when there is step in the process temperature (illustrated at reference numeral 316 in FIG. 7) and a measured response (illustrated at reference numeral 318) in FIG. 7.

Figure 8A:
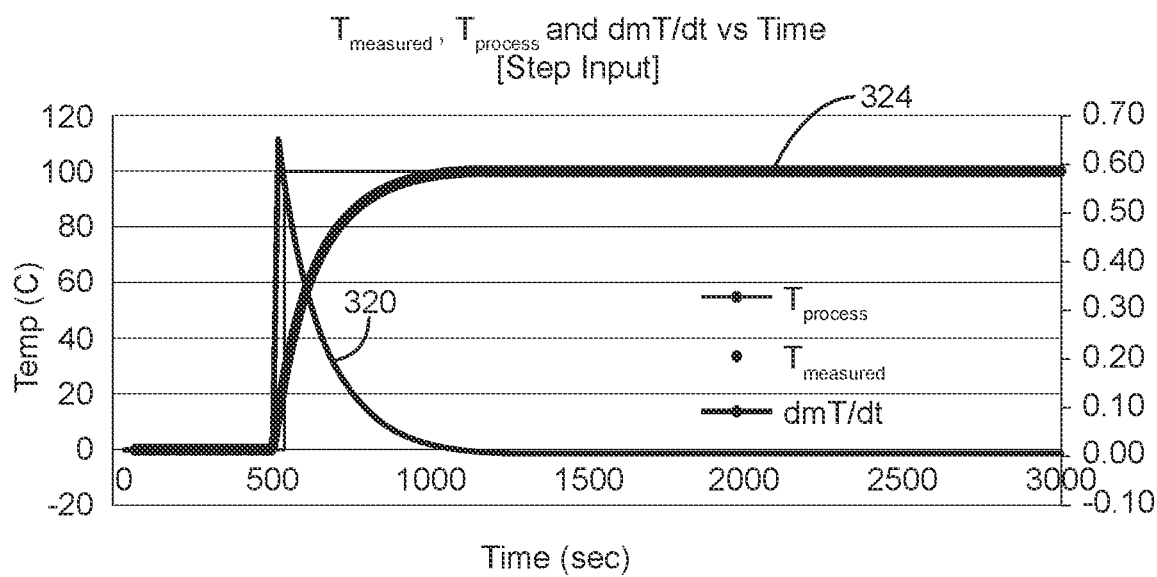
FIGS. 8A and 8B illustrate first and second time derivatives, respectively, of the measured temperature for a step process fluid temperature change.
Figure 8B:
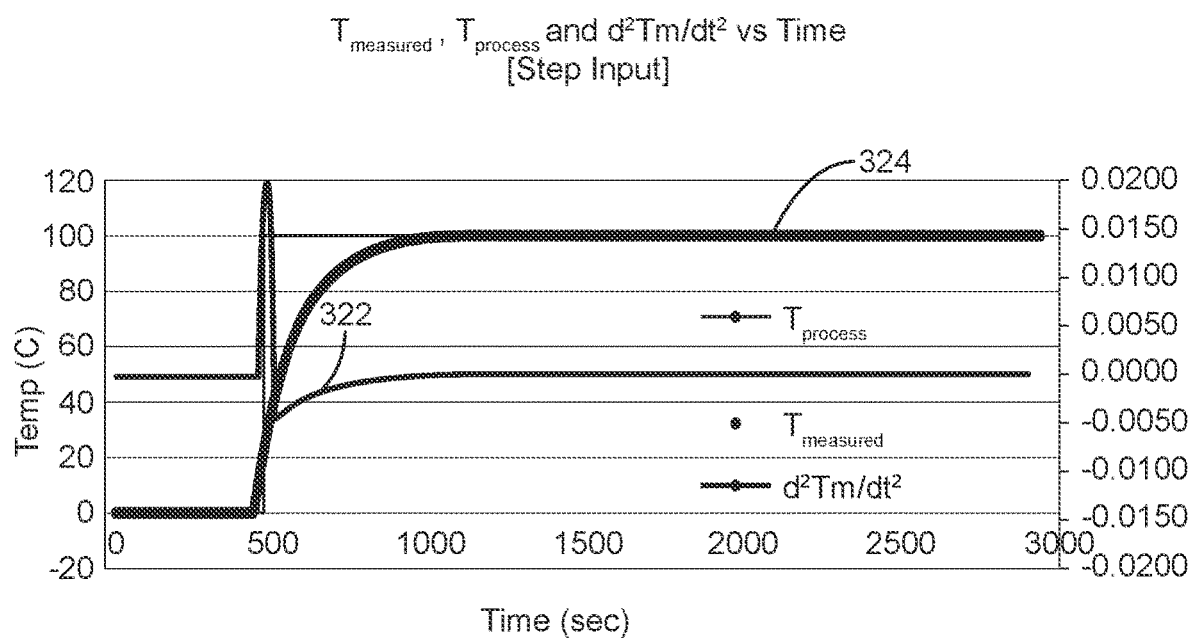

FIGS. 8A and 8B plot the first (reference numeral 320 in FIG. 8A), and second (reference numeral 322 in FIG. 8B) time derivatives of the measured temperature for a step change in the process temperature (324). The derivative values are shown on the right-side axes. Examining FIG. 8A, there is a sharp discontinuity in the first time derivative of Tm(t) at the start of the Tprocess step change. In addition, shown in FIG. 8B, there is a sign inversion in the second order time derivative of Tm(t) at the start of the step. These are signals that a temperature step transition has occurred in the process temperature and that application of Equation 9 is justified to extract a value of tau.

Figure 9:
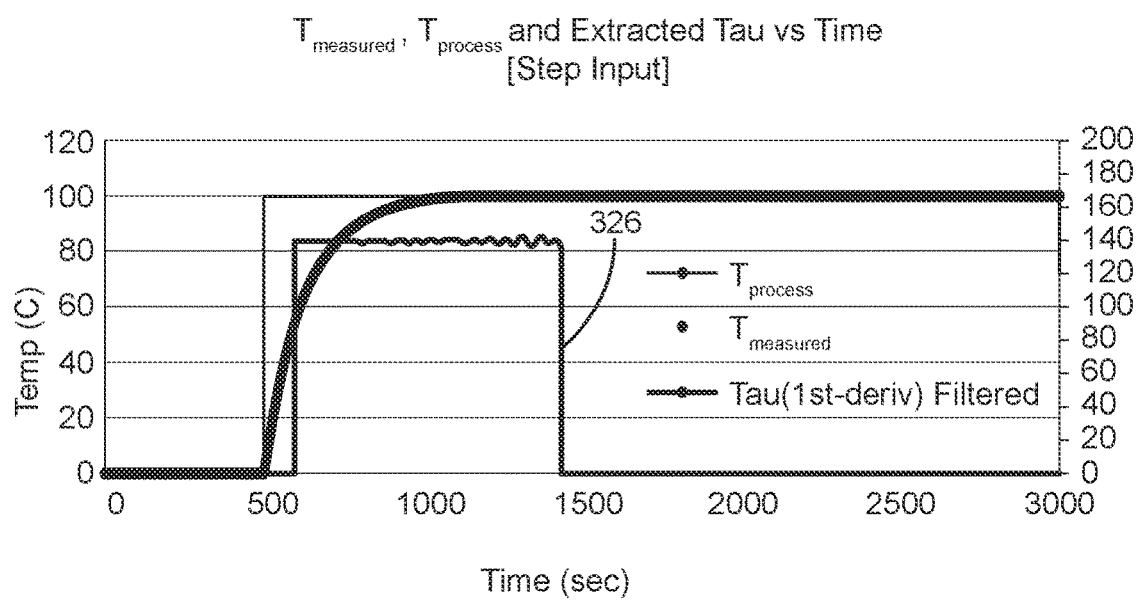
FIG. 9 illustrates the real-time extracted tau value during a period of validity for a step input.

FIG. 9 shows the real-time extracted tau value at reference numeral 326 using Equation 9 during the period of validity. The extracted tau value (right axis) is very close to 140 seconds, which is the actual system response. Note that after the system has reached steady-state and Tmeasured(t)=Tprocess(t), the derivatives are zero and the extraction method of Equation 9 can no longer be used.

Figure 10:
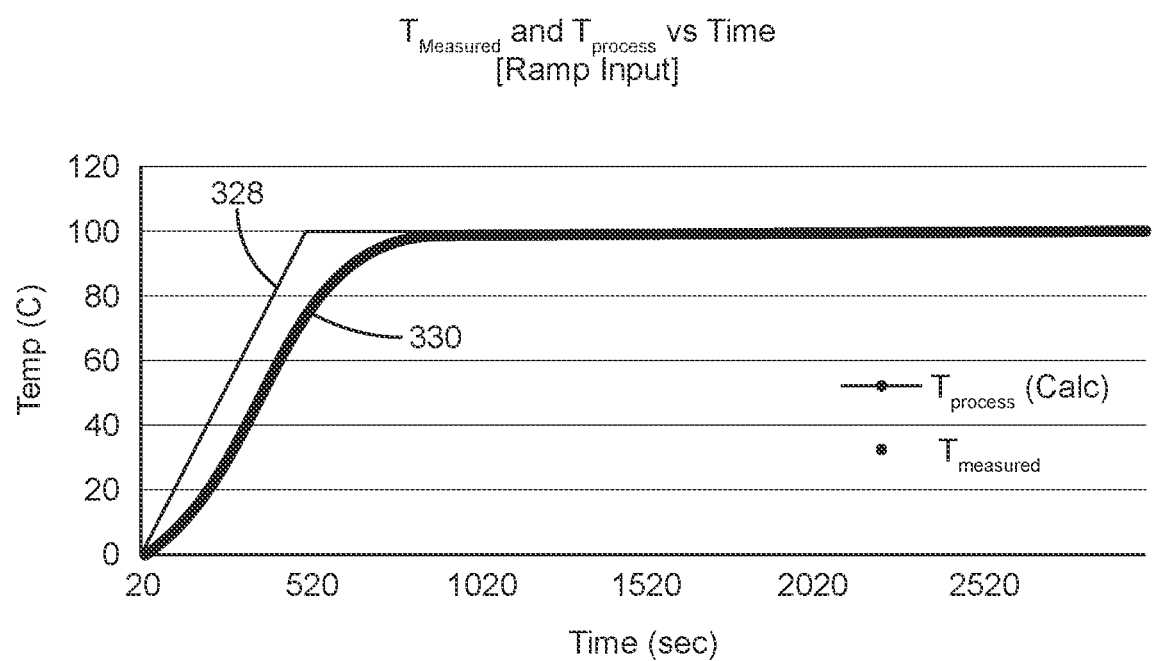
FIG. 10 illustrates a process fluid temperature ramp input and a measured response.

For Case 2, and a temperature ramp input, the validity range can be determined as was done in Case 1, by monitoring in real time the first and second order time derivatives of the measured temperature. The process ramp (reference numeral 328) and measured response (reference numeral 330) are displayed in FIG. 10.

Figure 11A:
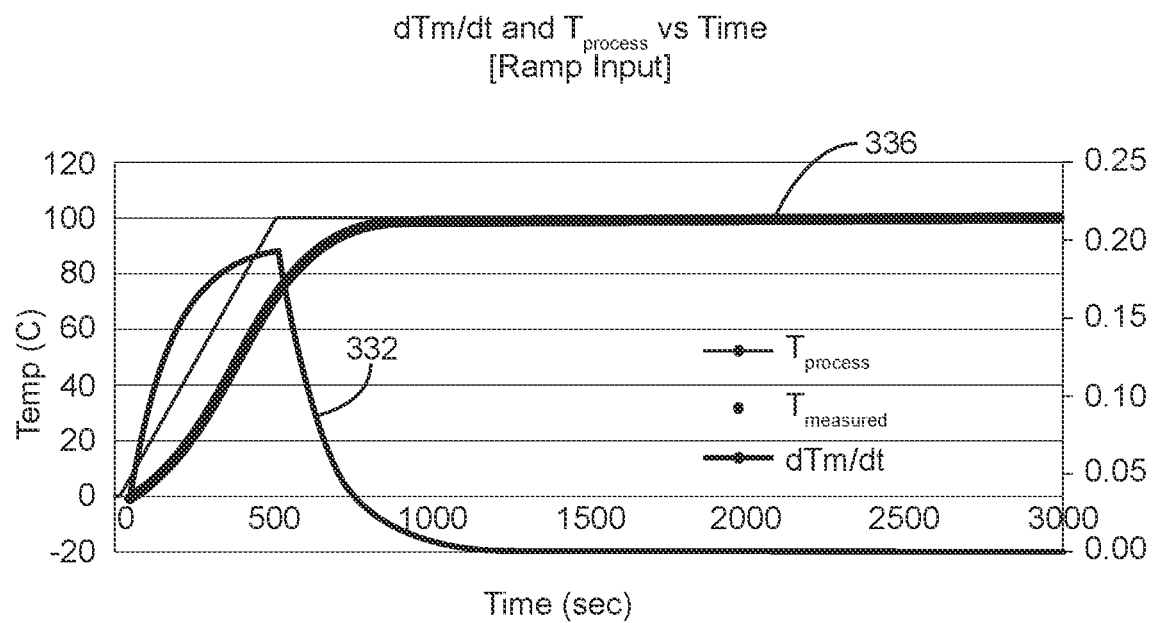
FIGS. 11A and 11B illustrate first and second time derivatives, respectively, of the measured temperature for a ramp change in the process fluid temperature.
Figure 11B:
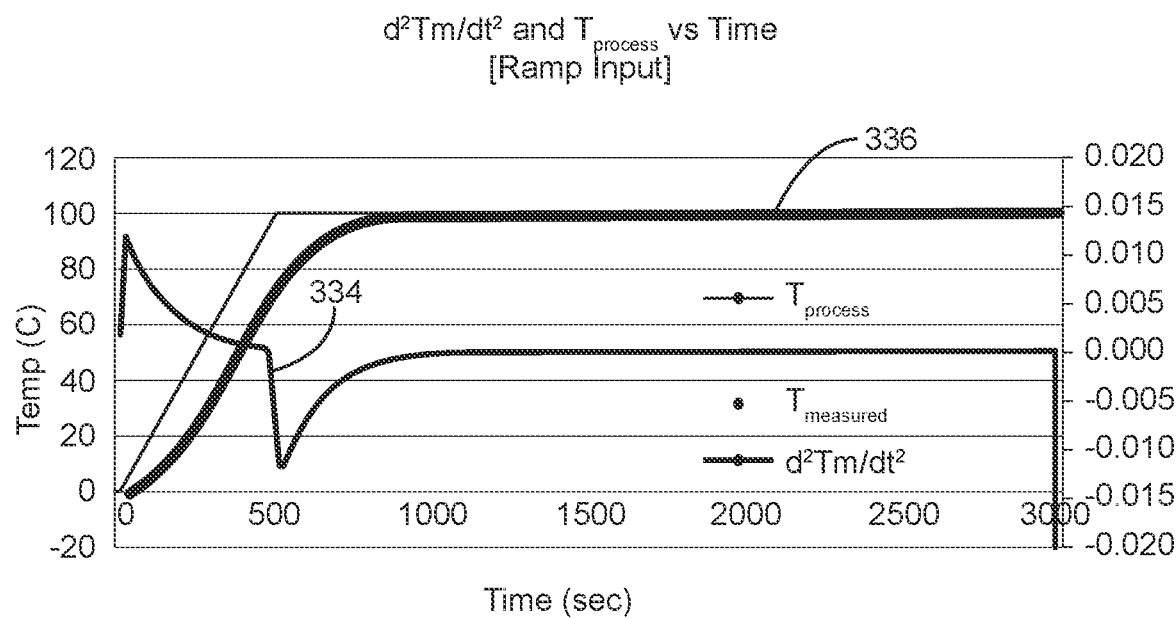

FIGS. 11A and 11B show the first (332) and second (334), time derivatives, respectively, of the measured temperature for a ramp change in the process temperature (336). Again, the derivative values are the right-side axes. Examining FIG. 11A, there is a gradual rise in the first time derivative of Tm(t) during the Tprocess ramp. In addition, there is an inversion in the second order time derivative of Tm(t) during the ramp. The gradual change regions are signals that a temperature ramp transition has occurred in the process temperature and that Equation 10 is justified to extract a value of tau.

Figure 12A:
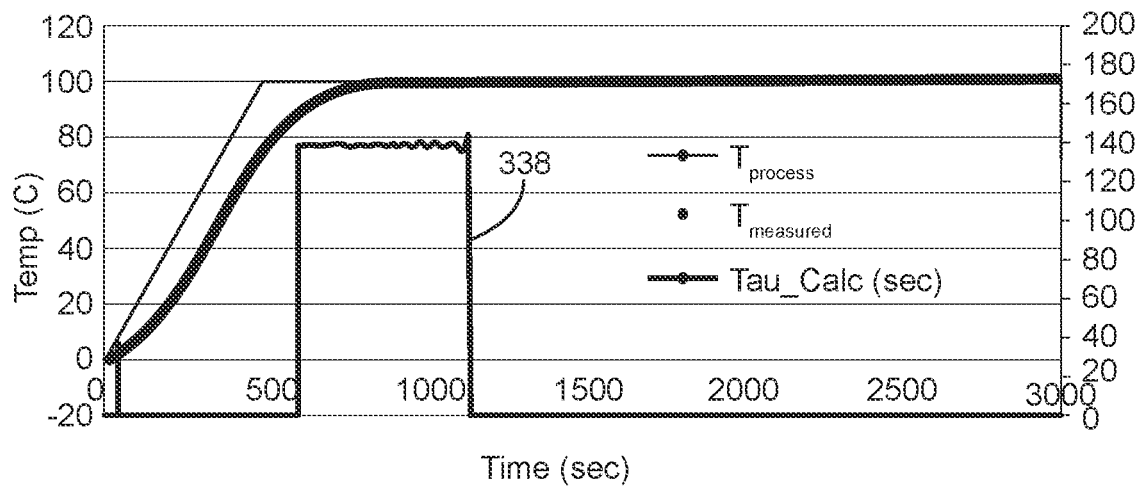
FIG. 12A shows the first-order time derivative-extracted tau value for a ramp input versus time during the period of validity.
Figure 12B:
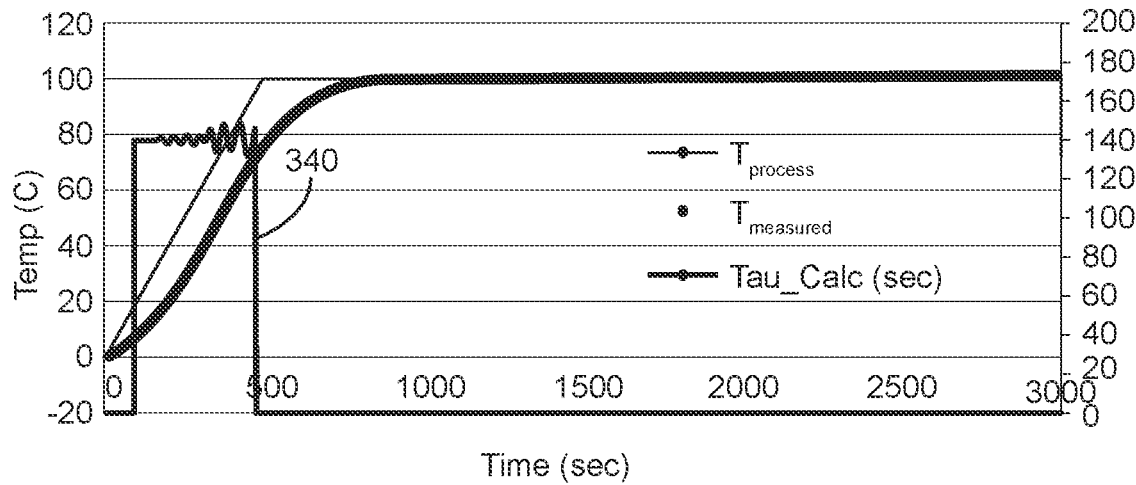
FIG. 12B shows the second-order time derivative-extracted tau value for a ramp input versus time during the period of validity.

FIG. 12A shows the real-time extracted tau value (338) using Equation 10 during the period of validity. The extracted tau value is very close to 140 seconds, which is the actual system response. In addition, Equation 9 can also be applied once the ramp has concluded with the result displayed in FIG. 12B. As in Case 1, note that after the system has reached steady-state and Tmeasured=Tprocess, the derivatives are zero and the extraction method of Equations 9 or 10 can no longer be used as evidenced by the increased noise (small oscillations in lines 338 and 340 of FIGS. 12A and 12B, respectively).

The above examples illustrate that it is possible to enhance the time response of the heat flow-based process fluid temperature estimation system using only the measured output provided the system transfer function is known. For thermal systems, this translates into knowing what the system's time response function is, or for most cases, knowing the first order response time, i.e., the value of tau. The value of tau appropriate to the system can be determined from the process conditions and pipe configuration, or as illustrated, directly from the measured temperature under specific conditions.

Although the present invention has been described with reference to preferred embodiments, workers skilled in the art will recognize that changes may be made in form and detail without departing from the spirit and scope of the invention.

What is claimed is:

1. A process fluid temperature estimation system comprising:
    a mounting assembly configured to mount the process fluid temperature estimation system to an external surface of a process fluid conduit:
    a sensor capsule having at least one temperature sensitive element disposed therein and configured to sense at least a temperature of the external surface of the process fluid conduit;
    measurement circuitry coupled to the sensor capsule and configured to detect a characteristic of the at least one temperature sensitive element that varies with temperature and provide sensor capsule temperature information;
    a controller coupled to the measurement circuitry, the controller being configured to obtain a temperature measurement of the external surface of the process fluid conduit and to obtain a reference temperature and employ a heat transfer calculation with the reference temperature, the external surface temperature measurement and a known thermal relationship between the external surface temperature sensor in the sensor capsule and the reference temperature to generate an estimated process fluid temperature output;
    wherein the controller is configured to obtain a system response function that models a system time constant ($\tau$) and utilize the system response function to adjust the estimated process fluid temperature output; and
    wherein the controller is configured to employ a plurality of discretized differential equations and is configured to select one of the plurality of discretized differential equations based on a type of thermal change.

2. The process fluid temperature estimation system of claim 1, wherein the type of thermal change is a step change.

3. The process fluid temperature estimation system of claim 1, wherein the type of thermal change is a ramp change.

4. The process fluid temperature estimation system of claim 1, wherein the controller is configured to select one of the plurality of discretized differential equations by computing a first order derivative of the external surface temperature measurement over time.

5. The process fluid temperature estimation system of claim 4, wherein the controller is configured to select one of the plurality of discretized differential equations by computing a second order derivative of the external surface temperature measurement over time.

6. The process fluid temperature estimation system of claim 1, wherein the controller is configured to extract a response time ($\tau$) from a set of raw temperature measurements of the external surface of the process fluid conduit.

7. A method of operating a process fluid temperature estimation system, the method comprising:
    receiving an indication of a temperature of an external surface of a process fluid conduit;
    receiving an indication of a reference temperature having a known thermal relationship with the external surface of the process fluid conduit;
    receiving a system response function that models a system time constant ($\tau$):
    performing a heat flow calculation, with a processor of the process fluid temperature estimation system, to provide a process fluid temperature output based on the indication of temperature of the external surface of the process fluid conduit and the indication of reference temperature;
    selecting, with the processor of the process fluid temperature estimation system, one of a plurality of discretized differential equations based on a type of thermal change; and
    performing the selected discretized differential equation with the processor of the process fluid temperature estimation system to adjust the process fluid temperature output based on the system response function.

8. The method of claim 7, wherein the differential equation uses the system time constant ($\tau$).

9. The method of claim 8, wherein the system time constant ($\tau$) is determined using formulas describing thermal properties of the process fluid conduit.

10. The method of claim 8, wherein the system time constant ($\tau$) is determined using formulas describing the thermal properties of the process fluid conduit and the process fluid.

11. The method of claim 8, wherein the system time constant ($\tau$) is extracted from a series of indications of temperature of the external surface of the process fluid conduit over time.

12. The method of claim 7, wherein a region of valid ($\tau$) extraction is determined from a first time derivative of a series of indications of temperature of the external surface of the process fluid conduit over time.

13. The method of claim 8, wherein a region of valid ($\tau$) extraction is determined from the second time derivative of a series of indications of temperature of the external surface of the process fluid conduit over time.

* * * * *